3,399,850
AUTOMATIC LANDING APPROACH CONTROL
SYSTEM FOR AIRCRAFT
Kenneth C. Kramer, Thousand Oaks, and Don M. Archibald, Malibu, Calif., and Harold N. Tobie, Mercer Island, Wash., assignors to Lear Siegler, Inc., Santa Monica, Calif., a corporation of Delaware
Continuation of application Ser. No. 463,548, June 14, 1965. This application Sept. 6, 1967, Ser. No. 687,932
10 Claims. (Cl. 244—77)

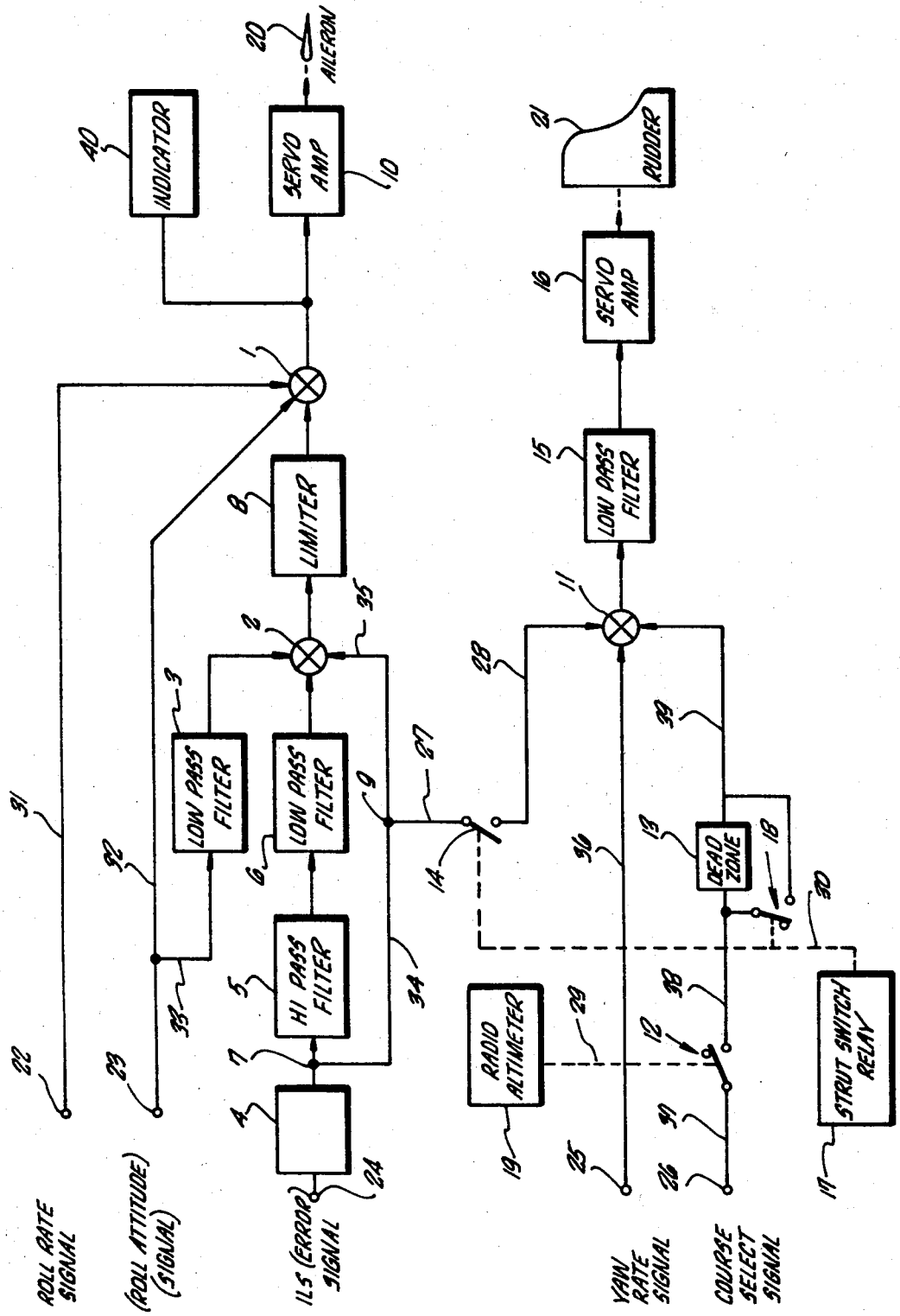

ABSTRACT OF THE DISCLOSURE

An automatic landing system is disclosed which includes a roll axis and a yaw axis control system. In the roll axis, runway heading error signals and the integral of ILS beam error signals are eliminated. Instead a lagged roll rate input term acts as one portion of a roll axis command. Accordingly a crab angle relative to runway heading is permissible provided that the angle is maintained with fixed limits as defined by a limit circuit connected between a command output signal junction and a roll axis control. Although runway heading error is employed in the yaw axis control system, it is employed only in the immediate vicinity of landing area, and is limited in its application by a dead zone circuit until touchdown when the dead zone limiting circuit is shorted out and runway heading error is directly applied in yaw axis control. Also applied at touchdown is ILS beam rate error.

Cross-reference to related application

This is a continuation of application Ser. No. 463,548 filed June 14, 1965, now abandoned.

This invention relates to instrument landing approach systems for aircraft. More particularly this invention relates to improved systems which provide greatly increased accuracy in lateral guidance during automatic landings.

At the present time, instrument landing systems are comprised of both ground and airborne equipment. A transmitter, normally positioned at the far end of a runway, provides a beam of radio signals defining an approach path to the runway. Apparatus on the aircraft detects the radio signals and provides error signals of a magnitude proportional to the angular displacement of the aircraft from the center of the beam. In the past, error signals have been displayed in the cockpit so that the pilot could see how far he was off the beam center, and maneuver the aircraft back. The signal could also be coupled to the autopilot to provide a completely automatic landing approach.

When signals from the transmitter are used in automatic approaches to steer the airplane in the roll axis, the aerodynamic sluggishness and inertia of the aircraft in response to turning commands is such that it is difficult to keep the aircraft on the center of the beam particularly in the vicinity of the runway where the beam becomes very narrow. Instability generally occurs in the area near the runway with resultant overshooting. The usual method of preventing the overshooting due to instability is to use a derived rate of change of beam signal or a course error signal (error from desired heading) to damp the overshooting.

Automatic landing requires lateral guidance accuracy which has heretofore been unattainable because of the instabilities encountered and because of the excessive control activity when derived beam rate is used to eliminate the instability. The course error signal cannot be used for automatic landing because of errors which are encountered due to changing cross wind conditions near the ground.

It is the object of this invention to provide a lateral automatic landing system which will minimize the control activity due to the derived beam rate signal, will minimize lateral touchdown errors due to cross wind conditions encountered near the ground, and will provide the accuracy required for an automatic landing.

It is another object of this invention to provide an improved yaw damping system in the landing mode.

It is another object of this invention to provide an automatic decrab maneuver to reduce the airplane crab angle to a safe magnitude prior to the automatic landing.

It is another object of this invention to provide automatic lateral control of the aircraft after touchdown to control the aircraft to the center of the runway while it is decelerating.

It is another object of this invention to provide a signal which can operate a visual indicator system to provide a means for the pilot to steer the aircraft with sufficient lateral guidance accuracy to land the aircraft without visual contact with the ground.

The above and other objects of this invention will be evident from a consideration of the following detailed description thereof taken in connection with the accompanying drawing illustrating a preferred embodiment of the invention.

The basic function of the lateral control system is to provide the correction signals necessary to control the aircraft to the center of the radio beam and to maintain the aircraft in the center of the beam as it approaches the runway, touches down, and decelerates.

When the automatic landing system is engaged, and the aircraft is within receiving range of the transmitted localizer (ILS) signal, the heading of the aircraft will be automatically changed, as necessary to control the aircraft on the center of the radio beam. If cross wind conditions change as the aircraft approaches the runway, the aircraft heading will be automatically changed to maintain the aircraft position in the center of the radio beam. The beam tracking signals are introduced into the roll axis in such a manner as to limit the aircraft bank angle to provide smooth correction.

The yaw axis provides a yaw damping function to assist the roll axis in controlling the aircraft in the center of the beam without the usual instability. The gain of the yaw axis is unusually high and as a consequence of the high gain tends to oppose turning of the aircraft as commanded by the roll axis. The resultant is a pseudo sideslip control that slips the aircraft toward the center of the beam, which means that beam error corrections can be accomplished more quickly and smoothly than with previous systems.

The lateral control system converts the individual input signals, namely, roll attitude signal, roll rate signal, ILS error signal, course select signal, and yaw rate signal, into two output signals, namely, a roll axis output signal and a yaw axis output signal. The individual input signals are summed at three separate summing junctions 1, 2, and 11 in the manner described below.

The equipment referred to in this description and the accompanying drawings accomplishes the purpose of this invention by combining signals in a novel manner to achieve a desired result in the instrument landing of an aircraft. A first means in the aircraft provides a first electrical signal in response to the lateral deviation of the aircraft from a desired path. The first electrical signal represents the ILS error signal which, in the drawing is fed in at terminal 24. A second means in the aircraft provides a second electrical signal proportional to the displacement of the aircraft from a predetermined attitude about the roll axis of the aircraft. The second electrical signal represents the roll attitude signal which is fed in at terminal 23 by vertical gyro means in a manner well known in the art. The sense and magnitude of the roll attitude signal put out by a roll attitude sensor, which represents the second means in one embodiment, is a function of the sense and the amount of displacement of the aircraft about the roll axis from a predetermined attitude. A third means provides a third electrical signal proportional to the rate of change of displacement about the roll axis. Such third electrical signal is put out by a roll rate gyro and as the roll rate signal, is fed in at terminal 22.

A fourth signal means provides a fourth electrical signal in response to the displacement of the aircraft from a selected course. In an embodiment of this invention, such signal is fed in at terminal 26 of the drawing.

A fifth signal means provides a fifth electrical signal proportional to the rate of displacement of the aircraft about the yaw axis. Such fifth signal, which is provided by a yaw rate gyro, is fed in at terminal 25.

The aircraft also has a first signal responsive means thereon which actuates a first control surface means on the aircraft to control the motion of the aircraft about the roll axis thereof. In the illustrative embodiment of this invention such first signal responsive means is responsive to the signals from at least two or more of said first, second, and third means in the manner hereinafter described and claimed to actuate such first control surface means to control the motion of the aircraft about the roll axis. In the illustration given in the drawing, the ailerons 20 constitute the control surface means.

In the illustrative embodiment of this invention, a second signal responsive means actuates a second control surface means to control the motion of the aircraft about the yaw axis. In a further embodiment, such second signal responsive means is responsive to at least one or more of said first, fourth and fifth signal emitting means so as to actuate a second control surface means on the aircraft. In this further embodiment, the rudder 21 constitutes such second control surface means.

In the illustrative embodiment of this invention a first low pass filter means is responsive to the second signal to provide a seventh signal. The first signal responsive means is responsive to the first signal and to the seventh signal (in addition to its response to any other signals) when actuating the first control surface means so as to return the aircraft to a desired flight path. In a nonlimiting example, such low pass filter means is illustrated by low pass filter 3 in the drawing.

In the illustrative embodiment of this invention, a high pass filter means is responsive to the first signal to provide a sixth signal proportional to the rate of change of the first signal. The first signal responsive means is then responsive to the first signal, the sixth signal, and the seventh signal to actuate the first control surface means so as to return the aircraft to the desired flight path.

In another embodiment of this invention, a third signal responsive means provides the pilot with visual indication to enable him to manually control the aircraft with the accuracy and precision of the automatic landing system. In a further embodiment such third signal responsive means is responsive to one or more of said first, second and third signal means and one or more of said sixth and seventh signals to provide the pilot with visual steering information. In a nonlimiting example, the third signal means is a flight director indicator well known in the art whereby the pilot maneuvers the aircraft in a manner to keep the lateral steering bar centered. In doing so the aircraft follows the beam center or a computed path to return to beam center if it is off the beam center.

Other embodiments of this invention become apparent from the description which follows as well as from the claims appended hereto.

The roll rate input signal from terminal 22, the roll attitude input signal from terminal 23, and the combined output signals from summing junction 2 are fed to summing junction 1. The roll rate signal from terminal 22 is fed to summing junction 1 through conductor 31. The roll attitude signal from terminal 23 is fed to two points. One portion of the roll attitude signal is fed directly to summing junction 1 through conductor 32. The other portion of the roll attitude signal is fed through conductor 33 and low pass filter 3 to summing junction 2. The output from low pass filter 3 provides a lagged roll attitude damping signal to improve the stability, particularly as the aircraft nears the approach end of the runway. The ILS error signal fed in at terminal 24 has an amplitude proportional to the annular displacement of the aircraft from the center or equipotential line of the localizer beam approach to the runway. The phase or polarity of the signal corresponds to the side of the equipotential line on which the aircraft is positioned. When the ILS error signal fed in at terminal 24 is a D.C. signal, it is modulated in unit 4 to provide an A.C. signal at common terminal point 7. A portion of the ILS error signal is fed from common terminal 7 through conductors 34 and 35 directly to summing junction 2. If the aircraft is on the ILS beam center, the ILS error signal is zero. If the aircraft tends to move out of the ILS beam center, the ILS error signal will command aileron 20 to move the aircraft back to ILS beam center.

Another portion of the ILS error signal is fed through high pass filter 5 to provide a signal proportional to the rate of change of the ILS error signal in a manner well known in the art. The derived rate output signal from high pass filter 5 is fed to low pass filter 6. The output from the filter 6, representing a filtered derived rate signal proportional to the rate of change of the ILS error signal, is fed to summing junction 2 where it is algebraically summed with the ILS error signal fed directly from common terminal 7, and with the output signal from low pass filter 3. The shaped beam rate signal from filters 5 and 6 is a command term which tends to alter the directly applied ILS beam error signal. The beam rate term either aids or opposes the ILS beam error signal. Thus, if the aircraft is in the beam center and starts to deviate therefrom, the rate of change away from the beam signal is a command term to keep the aircraft on the beam center. If the aircraft has stabilized at a position other than ILS beam center, then the directly applied ILS error signal moves it back and the rate of change of the aircraft toward beam center opposes the ILS error signal so that the aircraft does not overshoot ILS beam center.

The output signal from summing junction 2 is passed through limiter circuit 8 to summing junction 1. Limiter 8 limits the voltage of the output signal therefrom to a predetermined magnitude and thereby limits the maximum bank angle that the aircraft will be subjected to in response to the ILS error signal. One embodiment by which this is accomplished is disclosed in the description of limit #1 in the specification and in FIG. 4 of the drawings in United States Patent No. 3,136,502 of the common assignee. Low pass filters and high pass filters are well known in the art and will not be discussed further here.

Summing junction 1 algebraically sums the signals from roll rate signal input terminal 22, roll attitude signal from input terminal 23 and the output signal from limiter 8. The roll attitude and roll rate signals null out the command term from limit circuit 8 when the aircraft has achieved the commanded and desired directional movement to return it to ILS beam center. Low pass filter 3 emits a lagged roll attitude signal which, being of the same polarity and/or phase as the roll attitude signal, tends to decrease the amount of roll attitude after an amount of time determined by the time constant of filter 3. Thus, low pass filter 3 is a long-term roll attitude correction which decreases the amount of commanded roll attitude and thus stabilizes the aircraft's movements relative to beam center. It is inherent from the novel circuit operation described hereinbefore that the roll axis circuit keeps the aircraft in ILS beam center, with its wings level, but it may, due to crosswinds, have a crab angle because no heading error is present in the roll axis circuit of this invention either as a command or as a damping term. The output from summing junction 1 is fed to the autopilot (A/P) servo amplifier 10 and to indicator 40. The output from the servo amplifier is fed to an actuator (not shown) which actuates the ailerons 20 on the aircraft in a manner such as to provide the proper bank angle in order to bring the aircraft back to the center of the ILS beam and reduce the ILS error signal to zero. The signal to the indicator drives a steering bar on the indicator allowing the pilot to maneuver the aircraft manually in a manner to keep the steering bar centered and thereby be assured that the aircraft is following the beam center or a computed path to return the aircraft to beam center if displaced.

The yaw rate signal from terminal 25 is fed to summing junction 11 and the output signal from the latter is fed to low pass filter 15. The output signal from low pass filter 15 is fed to servo amplifier 16. The output signal from the latter is fed to a rudder actuator (not shown) which actuates the rudder 21 to provide yaw damping control.

When the aircraft has descended to a predetermined altitude (15 feet in one system embodiment, for example) during the landing procedure, switch 12 is closed by radio altimeter 19 through means 29 which can be either electrical or mechanical. When switch 12 is closed, the course select signal from terminal 26 is passed therethrough and through dead zone means 13 to summing junction 11. Dead zone or suppressing means 13 is preset to restrict or prevent the passage of signals below a predetermined magnitude, that is, dead zone 13 permits signals in excess of a given magnitude only to pass to the summing junction 11. The course select signal is combined in summing junction 11 with the yaw rate signal from terminal 25. Thus, below a predetermined altitude, when switch 12 is closed, the rudder is controlled by the combination of yaw rate signal and course select signal.

An example of a dead zone circuit is given in the above-referenced patent. The magnitude of the signal portion that is restricted is different for different aircraft. In a non-limiting example in one craft, the breakdown voltage of the dead zone was set at 500 millivolts. In this craft, such a breakdown voltage would permit a signal in excess of a signal magnitude equivalent to a 4 degree error in heading, to pass through to summing junction 11 and to control rudder 21 and cause the aircraft to slip so as to reduce the heading error to 4 degrees. In other words, a crab angle of 4 degrees is permissible on landing for the aircraft in this example. Heading errors on landing of greater or less than 4 degrees are permissible for other aircraft and the dead zone will accordingly be set to provide for an appropriate breakdown voltage.

From the above, it is seen that the combined signal which is fed from summing junction 1 to the aileron actuating mechanism is for the purpose of banking the aircraft to bring it back to the center of the landing beam. The combined signal from summing junction 11, controls the yaw attitude of the aircraft so as to keep it aligned with the runway heading below a predetermined aircraft altitude.

At touchdown, a strut switch (not shown) energizes a relay 17 which closes switches 14 and 18 through means 30. Switch 18 shorts out the dead zone circuit 13 and permits the course select signal from terminal 26 to pass directly to summing junction 11 through conductor 37, switch 12, conductor 38, switch 18 and conductor 39. Switch 14 permits the ILS error signal to pass to summing junction 11 through conductor 34, common terminal 9, conductor 27, switch 14 and conductor 28. On touchdown, therefore, the ILS error signal is combined with the yaw rate gyro signal and the course select signal. Consequently, during the aircraft roll-out after landing, the ILS error signal is applied to the yaw channel where it becomes the predominant signal and the aircraft is guided down the center of the runway by the ILS localizer signal.

In one aircraft for example, high pass filter 5, and low pass filter 6, each had a time constant of one second; low pass filter 3 had a time constant of 6 seconds; low pass filter 15 had a time constant of 0.1 second; dead zone 13 had a breakdown voltage of 500 millivolts and limiter 8 was designed to allow a maximum roll angle of 6 degrees. The values given in this example are illustrative only and are not to be taken by way of limitation since lateral control systems for different aircraft have different values depending on the design characteristics of the craft.

The control system described herein has been used with a conventional automatic pilot on an aircraft and it was found that the aircraft, upon landing, was held closer to the beam center than had been possible with prior art controls.

Although this invention has been described in detail with reference to specific examples, it is not intended that the invention should be limited by the above description or drawings, but is to be limited only by the spirit and scope of the appended claims.

What is claimed is:

1. An automatic landing control system for aircraft, which system is to be used in conjunction with a transmitting means located on a landing area for emitting electrical signals established along a desired landing beam path by said transmitting means, said aircraft having roll axis control means for controlling movements of said aircraft about a roll axis, said landing system comprising:

first signal emitting means in said aircraft for emitting a first electrical signal in response to the lateral deviation of said aircraft from said desired path established by said transmitting means;

second signal emitting means in said aircraft for emitting a second electrical signal proportional to the displacement of said aircraft from a predetermined roll attitude along a roll axis of said aircraft;

a first signal summing junction;

a second signal summing junction connected to the first summing junction;

means applying said first lateral deviation signal directly to said first summing junction;

rate circuit means connected to said first signal emitting means for applying a signal proportional to the rate of lateral deviation to said first summing junction;

means applying said second roll attitude signal directly to said second summing junction;

a low pass filter connected to said second signal emitting means and having a time constant selected to provide a lagged roll attitude signal;

means applying said lagged roll attitude signal to said first summing junction for detracting from the effect of said first signal applied thereto; and means applying the output of said second summing junction to said roll axis control means for actuating said control surface in a direction to hold said aircraft on said desired landing path.

2. An automatic landing system in accordance with claim 1 wherein said rate circuit comprises:

a high pass filter and a second low pass filter connected in a tandem circuit;

means connecting said tandem circuit between said first signal emitting means and said first signal summing junction for applying an additional stabilizing signal to said first signal summing junction.

3. An automatic landing system in accordance with claim 2 wherein:

the output signal passed by said tandem circuit is an aiding signal relative to said lateral deviation signal when said aircraft is on said landing beam path and tends to depart from the landing beam; and the output signal passed by said tandem circuit is an opposing signal relative to said lateral deviation signal when said aircraft has stabilized off the landing beam path and tends to move toward the beam path.

4. An automatic landing control system in accordance with claim 1 and further comprising:
   yaw axis control means for actuating a second control surface on said aircraft for controlling movements of the aircraft about a yaw axis of said aircraft;
   third signal emitting means in said aircraft for emitting an electrical signal in response to the displacement error of said aircraft from a selected landing area course for said aircraft;
   a threshold circuit having a predetermined threshold level and connected to said third signal emitting means;
   means for applying a portion of said displacement error signal in excess of said predetermined level to said yaw axis control means only when said aircraft is below a predetermined altitude level above said landing area; and
   means responsive to touchdown of said aircraft on said landing area for applying the displacement error signal in full strength to said yaw axis control means.

5. An automatic landing control system in accordance with claim 4 wherein said means for applying a portion only of said displacement error signal comprises:
   altitude responsive means and first switch means actuated by said altitude responsive means upon descent of said aircraft to a predetermined altitude for connecting said threshold circuit between said third signal emitting means and said yaw axis control means.

6. An automatic landing control system in accordance with claim 5 wherein said means for applying the displacement error signal in full strength to said yaw axis control means comprises:
   runway contact responsive means;
   a by-pass circuit for shorting out said threshold circuit; and
   said by-pass circuit including second switching means responsive to said runway contact responsive means upon contact of said aircraft with the runway to short out said threshold circuit and to complete a direct connection for said displacement error signal to said yaw axis control means.

7. An automatic landing control system in accordance with claim 6 and further comprising:
   third switching means responsive to said runway contact responsive means upon contact of said aircraft with the runway to complete a connection for direct application of signals from said first signal emitting means to said yaw axis control means.

8. An automatic landing control system in accordance with claim 1 wherein said first signal summing junction algebraically sums a roll axis command term which comprises a lagged roll attitude signal, a beam displacement signal, and a rate-of-beam displacement signal, said system further comprising:
   a roll angle limit circuit connected between said first and second signal summing junctions, said limit circuit adapted to pass only roll axis command terms to said second summing junction which are less than a predetermined limit value.

9. An automatic landing control system for aircraft, which system is to be used in conjunction with a transmitting means located on a landing area for emitting electrical signals established along a desired landing beam path by said transmitting means, said aircraft having roll axis control means for controlling movements of said aircraft about a roll axis, said landing system comprising:
   first signal emitting means in said aircraft for emitting a first electrical signal in response to the lateral deviation of said aircraft from said desired path established by said transmitting means;
   second signal emitting means in said aircraft for emitting a second electrical signal proportional to the displacement of said aircraft from a predetermined roll attitude along a roll axis of said aircraft;
   signal summing means;
   means applying said first lateral deviation signal directly to said signal summing means;
   rate circuit means connected to said first signal emitting means for applying a signal proportional to the rate of lateral deviation to said signal summing means;
   means applying said second roll attitude signal directly to said signal summing means;
   a low pass filter connected to said second signal emitting means and having a time constant selected to provide a lagged roll attitude signal;
   means applying said lagged roll attitude signal to said signal summing means for detracting from the effect of said first signal applied thereto; and
   means applying the output of said signal summing means to said roll axis control means for actuating the aircraft, said control surface in a direction to hold said aircraft on said desired landing path.

10. An automatic landing control system for aircraft, which system is to be used in conjunction with a transmitting means located on a landing area for emitting electrical signals established along a desired landing beam path by said transmitting means, said aircraft having roll axis control means for controlling movements of said aircraft about a roll axis, said landing system comprising:
   first signal emitting means in said aircraft for emitting a first electrical signal in response to the lateral deviation of said aircraft from said desired path established by said transmitting means;
   second signal emitting means in said aircraft for emitting a second electrical signal proportional to the displacement of said aircraft from a predetermined roll attitude along a roll axis of said aircraft;
   signal summing means;
   means applying said first lateral deviation signal directly to said signal summing means;
   rate circuit means connected to said first signal emitting means for applying a signal proportional to the rate of lateral deviation to said signal summing means;
   a first direct current path for applying said second roll attitude signal directly to said signal summing means;
   a low pass filter connected to said second signal emitting means and having a time constant selected to provide a lagged roll attitude signal;
   a second direct current path connected between said low pass filter and said summing means for applying said roll attitude signal directly to said summing means for detracting from the effect of said first signal applied thereto; and means applying the output of said signal summing means to said roll axis control means for actuating the aircraft control surface in a direction to hold said aircraft on said desired landing path.

References Cited

UNITED STATES PATENTS 3,120,934  2/1964  Robertson _____ 244—77
3,136,502  6/1964  Auld et al. _____ 244—77

MILTON BUCHLER, *Primary Examiner.*

B. BELKIN, *Assistant Examiner.*